(12) United States Patent
Amonou et al.

(10) Patent No.: US 9,756,357 B2
(45) Date of Patent: Sep. 5, 2017

(54) METHODS AND DEVICES FOR ENCODING AND DECODING AN IMAGE SEQUENCE IMPLEMENTING A PREDICTION BY FORWARD MOTION COMPENSATION, CORRESPONDING STREAM AND COMPUTER PROGRAM

(75) Inventors: Isabelle Amonou, Cesson-Sevigne (FR); Stéphane Pateux, Rennes (FR); Nathalie Cammas, Sens de Bretagne (FR)

(73) Assignee: FRANCE TELECOM, Paris (FR)

( * ) Notice: Subject to any disclaimer, the term of this patent is extended or adjusted under 35 U.S.C. 154(b) by 651 days.

(21) Appl. No.: 13/638,525

(22) PCT Filed: Mar. 29, 2011

(86) PCT No.: PCT/FR2011/050687
§ 371 (c)(1),
(2), (4) Date: Sep. 28, 2012

(87) PCT Pub. No.: WO2011/121227
PCT Pub. Date: Oct. 6, 2011

(65) Prior Publication Data
US 2013/0034163 A1 Feb. 7, 2013

(30) Foreign Application Priority Data
Mar. 31, 2010 (FR) .................................... 10 52440

(51) Int. Cl.
*H04N 7/32* (2006.01)
*H04N 19/583* (2014.01)
(Continued)

(52) U.S. Cl.
CPC ............ *H04N 19/583* (2014.11); *H04N 19/52* (2014.11); *H04N 19/553* (2014.11); *H04N 19/57* (2014.11); *H04N 19/61* (2014.11); *H04N 19/70* (2014.11)

(58) Field of Classification Search
CPC . H04N 11/02; H04N 7/26; H04N 7/30; H04N 19/00587; H04N 19/00648;
(Continued)

(56) References Cited

U.S. PATENT DOCUMENTS 5,303,179 A * 4/1994 Kumar .................... G06G 7/62
327/335
5,881,301 A * 3/1999 Robbins ........................... 712/1
(Continued)

FOREIGN PATENT DOCUMENTS

WO 03085599 10/2003
WO 2006012428 2/2006

OTHER PUBLICATIONS

"Motion-Compensated Frame Interpolation Using Bilateral Motion Estimation and Adaptive Overlapped Block Motion Compensation" by Byeong-Doo Choi et al., 1051-8215 (c) 2007IEEE.*
(Continued)

*Primary Examiner* — Dramos I Kalapodas
(74) *Attorney, Agent, or Firm* — David D. Brush; Westman, Champlin & Koehler, P.A.

(57) ABSTRACT

A method and apparatus for encoding a sequence of images by predicting at least one current image by forward motion compensation from at least one reference image. Prediction implements, for at least one current block of the current image: forward projection of a block of the reference image on the current image, delivering a projected block at least partially overlapping the current block; partitioning the current block delivering a sub-block at least partially over-
(Continued)

lapped by at least one projected block; and at least one iteration of the following steps for at least one overlapped sub-block: checking that the overlapped sub-block complies with a predetermined allotting criterion; with a positive check, allotting, to the overlapped sub-block, one of the projected motion vectors; and with a negative check, and so long as a predetermined minimum size is not reached for the overlapped sub-block: partitioning of the overlapped sub-block.

17 Claims, 4 Drawing Sheets

(51) Int. Cl.
  *H04N 19/52* (2014.01)
  *H04N 19/70* (2014.01)
  *H04N 19/61* (2014.01)
  *H04N 19/553* (2014.01)
  *H04N 19/57* (2014.01)

(58) Field of Classification Search
  CPC ......... H04N 19/0096; H04N 19/00678; H04N 19/00612; H04N 19/00969; H04N 19/537; H04N 19/14; H04N 19/17; H04N 19/137; H04N 19/553; H04N 19/543; H04N 7/12; H04N 19/583; H04N 19/57; H04N 19/61; H04N 19/52; H04N 19/577; H04N 19/00721; H04N 19/521; H04N 19/30; H04N 19/139; H04N 19/597; H04N 19/46; H04N 19/176; H04N 19/103; H04N 19/573; H04N 19/70; H04N 19/54; H04N 19/105; H04N 19/523; H04N 19/194; H04N 19/23; H04N 19/53; H04N 19/513; H04N 19/182; H04N 19/58; H04N 19/51; G06K 9/36; G06T 7/2026; G06T 2207/10016; G06T 2207/20021
  See application file for complete search history.

(56) References Cited

U.S. PATENT DOCUMENTS

| | | | | |
|---|---|---|---|---|
| 5,929,940 | A * | 7/1999 | Jeannin | H04N 19/543 348/699 |
| 5,982,438 | A * | 11/1999 | Lin | H04N 19/63 375/240.12 |
| 5,990,810 | A * | 11/1999 | Williams | G06F 3/0608 341/51 |
| 6,012,428 | A * | 1/2000 | Yano et al. | 123/443 |
| 6,404,814 | B1 * | 6/2002 | Apostolopoulos | H04N 19/20 375/240.08 |
| 6,466,624 | B1 * | 10/2002 | Fogg | H04N 19/46 375/240.12 |
| 7,565,020 | B2 * | 7/2009 | Wu et al. | 382/238 |
| 7,653,133 | B2 * | 1/2010 | Woods | H04N 19/119 348/699 |
| 7,899,115 | B2 * | 3/2011 | Jeon | H04N 19/105 375/240.1 |
| 8,228,990 | B2 * | 7/2012 | Visharam | H04N 19/176 375/240.15 |
| 8,369,405 | B2 * | 2/2013 | Shi | H04N 19/577 375/240 |
| 8,625,669 | B2 * | 1/2014 | Holcomb | 375/240.13 |
| 8,787,460 | B1 * | 7/2014 | Hobbs | H04N 19/00 375/240.16 |
| 9,066,107 | B2 * | 6/2015 | Pateux | H04N 19/105 |
| 2005/0013498 | A1 * | 1/2005 | Srinivasan et al. | 382/239 |
| 2005/0053150 | A1 * | 3/2005 | Hsu et al. | 375/240.18 |
| 2005/0117646 | A1 * | 6/2005 | Joch et al. | 375/240.16 |
| 2005/0141614 | A1 * | 6/2005 | Braspenning | G06T 7/2026 375/240.16 |
| 2006/0017843 | A1 * | 1/2006 | Shi | H04N 5/145 348/441 |
| 2007/0047644 | A1 * | 3/2007 | Lee | H04N 19/176 375/240.1 |
| 2007/0217510 | A1 * | 9/2007 | Yamori et al. | 375/240.12 |
| 2007/0237232 | A1 * | 10/2007 | Chang et al. | 375/240.16 |
| 2008/0165850 | A1 * | 7/2008 | Sagetong et al. | 375/240.15 |
| 2008/0204592 | A1 * | 8/2008 | Jia | G06T 3/4007 348/402.1 |
| 2009/0060041 | A1 * | 3/2009 | Lertrattanapanich | H04N 19/51 375/240.16 |
| 2009/0067502 | A1 * | 3/2009 | Jeon | H04N 19/105 375/240.16 |
| 2009/0290643 | A1 * | 11/2009 | Yang | 375/240.16 |
| 2010/0128791 | A1 * | 5/2010 | Le Floch et al. | 375/240.16 |
| 2010/0201870 | A1 * | 8/2010 | Luessi | G06T 1/00 348/452 |
| 2010/0208827 | A1 * | 8/2010 | Divorra Escoda et al. | 375/240.24 |
| 2010/0215101 | A1 * | 8/2010 | Jeon | H04N 19/105 375/240.12 |
| 2011/0002389 | A1 * | 1/2011 | Xu | H04N 19/61 375/240.16 |
| 2011/0069237 | A1 * | 3/2011 | Wang | H04N 5/145 348/699 |
| 2011/0129015 | A1 * | 6/2011 | Nguyen | H04N 19/51 375/240.16 |
| 2011/0142132 | A1 * | 6/2011 | Tourapis | H04N 19/00721 375/240.16 |
| 2011/0150091 | A1 * | 6/2011 | Young | 375/240.16 |
| 2011/0176610 | A1 * | 7/2011 | He | G06T 1/0028 375/240.16 |
| 2011/0255601 | A1 * | 10/2011 | Pateux | H04N 19/176 375/240.16 |
| 2012/0051430 | A1 * | 3/2012 | Pateux | H04N 19/105 375/240.16 |

OTHER PUBLICATIONS

"Efficient Motion Estimation With Content-Adaptive Resolution" by Ralph Braspenning et al., Philips Research Laboratories, Sep. 2006.*

"Analysis and Architecture Design of Variable Block-Size Motion Estimation for H.264/AVC" by Ching-Yen Chen, 1057-7122 (c) 2006 IEEE.*

"Motion-Compensated Frame Interpolation Using Bilateral Motion Estimation and Adaptive Overlapped Block Motion Compensation" by Byeong-Doo Choi et al., 1051-8215 © 2007 IEEE.*

"Representation and coding of video sequences by 2D deformable meshes", by Patrick Lechat, University of Rennes No. 2255 dated Oct. 22, 1999.*

"An Entire Frame Loss Recovery Algorithm for H.264/AVC over Wireless Networks" by Min Li et al., No. 978-1-4244-3693-4/09 © 2009 IEEE.*

Byeong-Doo Choi et al., "Motion-Compensated Frame Interpolation Using Bilateral Motion Estimation and Adaptive Overlapped Block Motion Compensation" No. 1051-8215 © IEEE2007.*

Min Li et al., "An Entire Frame Loss Recovery Algorithm for H.264/AVC Over Wireless Network", 978-1-4244-3693-4 (C) IEEE2009.*

F.J.P. Lopes et al., "Analysis of Spatial Transform Motion Estimation With Overlapped Compensation and Fractional-Pixel Accuracy", 1350-245x (C) IEE1999.*

Byeong-Doo Choi et al., (hereinafter Choi), "Motion-Compensated Frame Interpolation Using Bilateral Motion Estimation and Adaptive Overlapped Block Motion Compensation" No. 1051-8215 © 2007 IEEE.*

Patrick Lechat (hereinafter Lechat) by Publication; "Representation and coding of video sequences by 2D deformable meshes", by Patrick Lechat, University of Rennes No. 2255 dated Oct. 22, 1999.*

(56) References Cited

OTHER PUBLICATIONS

F. J. P. Lopes et al., (hereinafter Lopes) "Analysis of Spatial Transform Motion Estimation With Overlapped Compensation and Fractional-Pixel Accuracy", 1350-245x © IEE1999.*
French Search Report and Written Opinion dated Oct. 4, 2010 for corresponding French Application No. 1052440, filed Mar. 31, 2010.
Xiangyang Ji et al., "Enhanced Direct Mode 3 Coding for Bi-Predictive Pictures" International Symposium on Circuits and Systems, May 23, 2004 (May 23, 2004), pp. III-785, XP010719382.
Patrick Lechat: Representation et codage video de sequences video par maillages 2D deformables (representation and video-encoding of video sequences by deformable 2D meshes), PhD Thesis, University of Rennes 1, pp. 130-131, Oct. 22, 1999.
International Preliminary Report on Patentability and Written Opinion for PCT/FR2011/050687 dated Oct. 2, 2012.
International Search Report for PCT/FR2011/050687 dated May 19, 2011, pp. 1-3.
Min Li et al: "An Entire Frame Loss Recovery Algorithm for H.264/AVC over Wireless Networks", IEEE International Conference on Wireless Communications, Network and Mobile Computing, Sep. 24, 2009 (Sep. 24, 2009), pp. 1-4, XP031554943.
Byeong-Doo Choi et al: "Motion-Compensated Frame interpolation Using Bilateral Motion Estimation and Adaptive Overlapped block Motion Compensation", IEEE Transactions on Circuits and Systems for Video Technology, IEEE Service Center, Piscataway, NJ, US, vol. 16, No. 4, Apr. 1, 2007 (Apr. 1, 2007), pp. 407-416, XP011179771.
Da Liu et al: "Direct Mode Coding for B Pictures using Virtual Reference Picture", IEEE International Conference on Multimedia and Expo, Jul. 1, 2007 (Jul. 1, 2007), pp. 1363-1365, XP031123887.

* cited by examiner

METHODS AND DEVICES FOR ENCODING AND DECODING AN IMAGE SEQUENCE IMPLEMENTING A PREDICTION BY FORWARD MOTION COMPENSATION, CORRESPONDING STREAM AND COMPUTER PROGRAM

CROSS-REFERENCE TO RELATED APPLICATIONS

This Application is a Section 371 National Stage Application of International Application No. PCT/FR2011/050687, filed Mar. 29, 2011, which is incorporated by reference in its entirety and published as WO 2011/121227 on Oct. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images, and especially of a video stream constituted by a series of successive images.

More specifically, the disclosure pertains to prediction techniques implementing forward motion compensation.

The disclosure can be applied especially to video encoding implemented in current video encoders (MPEG, H.264, etc.) or future video encoders (ITU-T/VCEG (H.265) or ISO/MPEG (HVC)).

BACKGROUND OF THE DISCLOSURE

Here below, the prior art is described in relation to the prediction of images in the field of the encoding or decoding of image sequences using a blockwise representation of the images. Thus, according to the H.264 technique for example, each image can be subdivided into macroblocks which are then subdivided into blocks. A block is constituted by a set of points or pixels.

More specifically, the AVC encoding standard defines a mode of block encoding called the "temporal direct" mode. This encoding mode derives the motion information for a block of a current image to be predicted from a block co-localized in a reference image. The motion vectors are scaled so that the amplitude of the shift characterized by the motion vector in the current image is proportional to the amplitude of the motion in the reference image and the temporal distance between the reference image and the current image.

Figure 1:
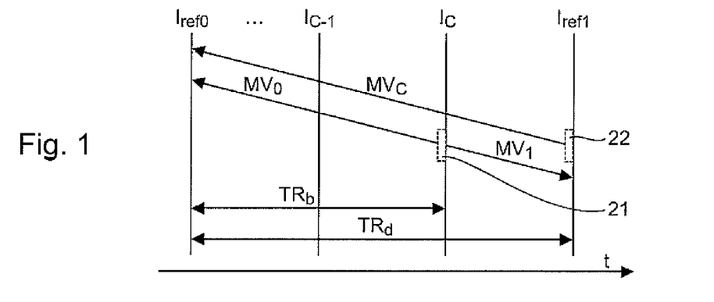
FIG. 1, described with reference to the prior art, illustrates the "direct temporal" encoding mode for a B type image.

FIG. 1 provides an illustration, by way of an example, of this mode of encoding for a type B image to be predicted Ic: the information on motion of a block 21 of the image to be predicted Ic, called the current block, is obtained from the co-localized block 22 in the reference image Iref1.

For a B type image, it is possible to define a two-way prediction of the current block 21 of the image to be predicted Ic by means of a dual motion compensation performed, on the one hand, on the motion vector $MV_1$ and the forward reference image Iref1 and on the other hand, on the motion vector $MV_0$ and the backward reference image Iref0. The motion vectors $MV_0$ et $MV_1$ are both derived from the motion vector $MV_C$ of the co-localized block 22 in the forward reference image Iref1, relatively to the backward reference image Iref0, and according to the following equations for the scaling of the motion vectors in the image to be predicted Ic:

$$MV_0 = \frac{TR_b}{TR_d} \times MV_C$$

$$MV_1 = \frac{TR_b - TR_d}{TR_d} \times MV_C$$

with: $TR_b$ being the temporal distance between the backward reference image Iref0 and the image to be predicted Ic; and $TR_d$ being the temporal distance between the backward reference image Iref0 and the forward reference image Iref1.

This technique limits the cost of motion encoding in an image implementing this mode of encoding for certain blocks because the information on motion thus derived was not encoded.

However, the way in which the information on motion is derived does not represent the real path of motion of the current block but uses the path of motion of a co-localized block in a reference image. Now this path of the co-localized block can be different from the path of the current block of the image to be predicted. During the encoding of the current block, the prediction by motion compensation is then not optimal because it does not use the information on texture corresponding to the real path of the current block but an approximate path.

Figure 2A:
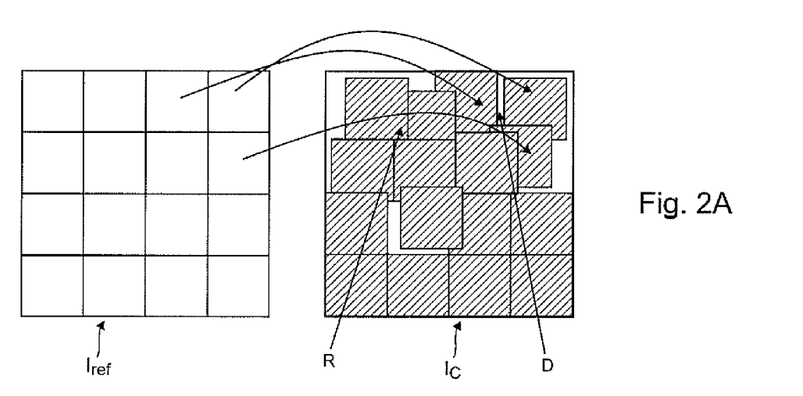
FIGS. 2A and 2B, also described with reference to the prior art, illustrate the technique of forward motion compensation.

To remedy this drawback, a known technique is that of forward-projecting the motion of the blocks of the reference image on the current image. Such a technique is called forward motion compensation and is described for example in Patrick Lechat: *Représentation et codage vidéo de séquences vidéo par maillages 2D déformables* (Representation and video-encoding of video sequences by deformable 2D meshes), PhD Thesis, University of Rennes 1, pages 130-131, 22 Oct. 1999. This forward motion compensation technique, illustrated in FIG. 2A, enables the prediction of an image Ic for at least one reference image Iref in taking account of motion vectors pointing from the reference image Iref towards the image to be predicted Ic, also called a current image. This compensation is done in two steps:

the reference image Iref is subdivided into a set of reference blocks;

for each reference block of the reference image, a shift is made and for each point of this block, the point of the current image Ic is allotted the value of the point of the reference image, shifted by the value of the motion vector.

In other words, the forward projection of the motion vectors projects the motion of a block of the reference image Iref on a block shifted in the current image Ic, called a projected block.

As illustrated in this FIG. 2A, this forward motion compensation technique gives rise to the appearance of overlapping zones R when several projected blocks overlap, or the appearance of uncovered zones D between the projected blocks.

Consequently, when a block of the current image is situated in an overlapping zone, this block can be allotted several motion vectors. Conversely, if a block of the current image is situated in an uncovered zone, no motion vector is allotted to this block.

Figure 2B:
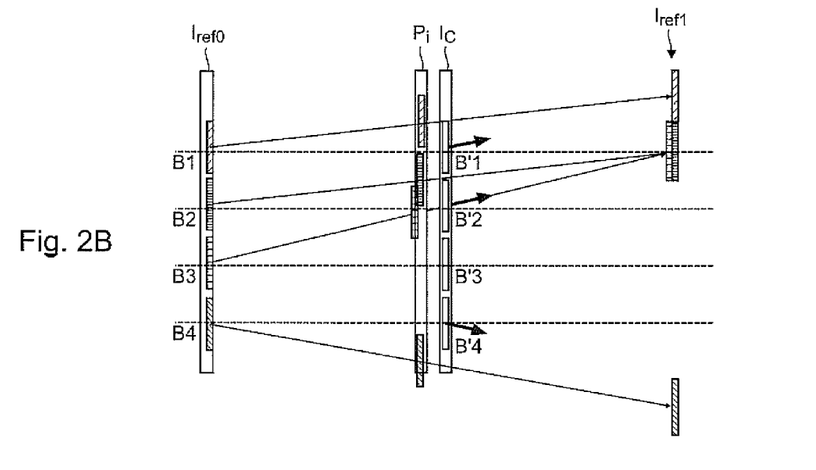

FIG. 2B provides an illustration, in another form, of the technique of forward projection of the motion of the blocks B1 to B4 of a first reference image Iref0 on a second reference image Iref1. The result of the forward projection of the blocks B1 to B4 on the blocks B1' to B4' of an intermediate image to be predicted, also called a current image Ic, is represented by the intermediate projection Pi. As illustrated in this FIG. 2B, a block of the current image Ic can then be allotted several motion vectors of the first reference image Iref0.

For example, the blocks B2 and B3 of the first reference image Iref0 are projected at the same place in the second reference image Iref1. As shown in the intermediate projection Pi, the projected blocks associated with the blocks B2 and B3 overlap. In the current image Ic, it is therefore possible to allot two motion vectors to the block B2': a first motion vector representing the shift of the block B2 in the current image, and the other vector representing the shift of the block B3 in the current image.

It may be recalled that, classically, the projected motion vectors allotted to a block of the current image must preliminarily be scaled relatively to the temporal distance between the current image Ic, the backward reference image Iref0 and the image in relation to which the motion vector has been computed (forward reference image Iref1).

One drawback of this forward motion compensation technique lies in the absence of allotting of values in the overlapped zones (for which several motion vectors are defined) or uncovered zones (for which no motion vectors are defined), which restricts the performance of the encoding scheme proposed.

The motion field thus defined according to this technique therefore does not enable the direct definition of a blockwise motion field as defined by the AVC encoding standard.

For each block of the current image to be predicted, it is however necessary to determine a motion vector which could for example be used for the motion compensation of the block during the prediction of the block in the encoding step.

In order to allot a single motion vector to a current block of the image to be predicted, when it is overlapped by several projected blocks and has therefore received several motion vectors, it has been proposed to build a new motion vector for the current block in weighting the information obtained from the different motion vectors of the projected blocks.

One drawback of this technique is its complexity since it implies computing the different motion vectors involved and weighting the information coming from the different projected blocks. Besides, the motion vector thus built is not necessarily adapted to the encoding if it does not sufficiently approach the real path of the current block.

It has also been proposed to apply a criterion of maximum overlapping to allot, to the current block of the image to be predicted, the motion vector of the projected block overlapping the most pixels of the current block. For example, returning to FIG. 2B, the maximum overlapping criterion allots the motion vector coming from the shifting of the block B3 to the block B2' of the current image, since the projection of the block B3 in the current image overlaps more pixels of the block B2' than the projection of the block B2 in the current image Ic.

Again, the motion vector thus chosen is not necessarily the best adapted to the encoding if it does not sufficiently approach the real path of the current block. Furthermore, this maximum overlapping criterion cannot be implemented when the blocks of the current image and of the reference image do not have the same size.

There is therefore a need for a novel technique of image encoding/decoding implementing a prediction by forward motion compensation that improves these prior-art techniques in providing, for at least certain blocks of the image to be predicted, a motion vector well adapted to the real path of these blocks.

SUMMARY

An embodiment of the invention proposes a solution that is novel as compared with the prior art, in the form of a method for encoding a sequence of images implementing a step for predicting at least one current image by forward motion compensation from at least one reference image, a step for predicting of this kind implementing, for at least one block of the current image, called a current block, a sub-step of forward projection of at least one block of the reference image on the current image, delivering at least one projected block at least partially overlapping the current block, a motion vector, representing the shift of the projected block in the current image, standardized to take account of a temporal distance between the reference image and the current image, called a projected motion vector, being associated with each projected block.

According to an embodiment of the invention, the step for predicting implements the following sub-steps for the above-mentioned current block:
partitioning of the current block delivering at least one sub-block at least partially overlapped by at least one of the projected blocks, called an overlapped sub-block;
at least one iteration of the following steps for at least one overlapped sub-block:
checking that the overlapped sub-block complies with a predetermined allotting criterion;
in the event of a positive check, allotting, to the overlapped sub-block, one of the projected motion vectors selected from among the projected motion vectors associated with the projected block or blocks at least partially overlapping the overlapped sub-block;
in the event of a negative check, and so long as a predetermined minimum size is not reached for the overlapped sub-block: partitioning of the overlapped sub-block delivering at least one new overlapped sub-block.

Thus, an embodiment of the invention proposes a novel and inventive approach for the allotting of a single motion vector to a block or a sub-block of an image to be predicted, when several motion vectors are available for this block.

In particular, an embodiment of the invention proposes to subdivide this current block into sub-blocks in order to work at the level of a sub-block to select the motion vector closest to the real path of the current block. This makes it possible to define a zone of the current image that is homogenous in motion and therefore to allot a single motion vector to this zone.

Furthermore, it is possible according to an embodiment of the invention to decide to allot no motion vector to a sub-block when a minimum size is reached for the overlapped sub-block and when it does not comply with the predetermined allotting criterion. Indeed, it is preferred according to an embodiment of the invention not to allot any motion vector to an overlapped sub-block rather than to allot an unsuited motion vector to it.

This minimum size is for example defined in the encoder. If the overlapped sub-block has reached this minimum size (4×4 for example), it is no longer possible to re-subdivide it.

This limits the complexity of the motion compensation. Indeed, motion compensation classically requires the performance of a sub-pixel interpolation in the reference image. In performing this sub-pixel interpolation on zones of the current image having a same motion vector (homogenous in motion), it is possible to group together the maximum number of computations, thus enabling a gain in processing time.

In this way, during the encoding of the current block according to one embodiment of the invention, the prediction by motion compensation of the block is optimal because it uses information on texture or motion corresponding to the path closest to the real path of the current block.

Hence, the cost of encoding the residue of texture or motion is thereby reduced.

Naturally, certain blocks or sub-blocks of the current image can be predicted (and, as the case may be, encoded) according to the proposed technique whereas other blocks or sub-blocks of the same image can be predicted (and possibly encoded) according to a classic technique such as the direct temporal mode described here above for example.

Similarly, if no motion vector is allotted to a block or sub-block at the end of the iterative partitioning according to an embodiment of the invention (for example because a minimum size has been reached for this sub-block or because this sub-block does not meet any allotting criterion), then it is possible to use another known technique for the prediction and possibly the encoding of this block or sub-block. Such a technique must be available to the encoder (classic intra encoding or inter encoding for example). Thus, for a block to be encoded in "inter" mode, it is necessary to allot a motion vector to all the sub-blocks of the block.

In particular, an embodiment of the invention makes it possible, according to at least one embodiment, to allot a motion vector to a block of the current image whatever the size of the blocks in the reference image and in the current image. Thus, it is possible that at least two blocks of the reference image will have a different size and/or that at least two blocks or sub-blocks of the current image will have a different size.

Now, the use of variable-sized blocks enables a finer prediction and therefore a gain in compression. An embodiment of the invention applied in this context therefore improves these gains in compression and thus defines a novel mode of block encoding that performs better in terms of bit-rate/distortion.

In order to allot the motion vector closest to the real shift of the current block, the current block is partitioned into sub-blocks and the sub-block or sub-blocks overlapped (partially or totally) by one or more projected blocks are considered.

Then, this overlapped sub-block is processed in different ways, in taking account of a predetermined criterion of allotting the sub-blocks belonging to the group comprising the following criteria:
  the overlapped sub-block is overlapped at least partially by only one of the projected blocks;
  a predetermined number of pixels of the overlapped sub-block is overlapped by one of the projected blocks.

If none of these criteria is verified for the overlapped sub-block considered, then this overlapped sub-block is partitioned again provided that the predetermined minimum size for the sub-block is not reached.

If not, the overlapped sub-block is allotted one of the projected motion vectors selected from among the projected motion vector or vectors associated with the projected block or blocks at least partially covering the overlapped sub-block.

A first example of a predetermined allotting criterion is a criterion of unicity of the projected motion vector: the overlapped sub-block is subdivided so long as it remains overlapped by several projected blocks. When the overlapped sub-block is overlapped by only one projected block, it is possible to allot to it the projected motion vector associated with this projected block. This limits the number of iterations made during the phase of searching for a motion vector to be allotted to the overlapped sub-block.

A second example of a predetermined allotting criterion is a criterion of overlapping: the overlapped sub-block is re-subdivided so long as it is not overlapped up to a certain percentage by a projected block. For example, if a block or sub-block is predominantly overlapped by a projected block, the projected motion vector associated with the projected block can then be considered to be a relevant candidate vector, and the search phase can be stopped.

According to one specific aspect of an embodiment of the invention, the allotting step selects the projected motion vector associated with the projected block overlapping the most pixels of the overlapped sub-block.

This selection can be done when several projected motion vectors are candidates for an overlapped sub-block. For example, this situation occurs if several projected blocks predominantly overlap the overlapped sub-block.

According to one variant, the allotting step implements the following for at least two projected blocks at least partially overlapping the overlapped sub-block with which the projected motion vectors (called candidate vectors) are associated:
  a step of backward projection, in the reference image, of the overlapped sub-block along each of the candidate vectors, delivering at least two backward projected sub-blocks (one backward projected sub-block per candidate vector);
  for each backward projected sub-block, determining the number of pixels of the reference image overlapped by the backward projected sub-block having a motion vector similar to the candidate vector, delivering an overlap rate per candidate vector;
  allotting, to the overlapped sub-block, the candidate vector having the best overlap rate.

This variant makes it possible to ensure the selection of the projected motion vector closest to the real motion of the current block, especially when the number of pixels (of the overlapped sub-block) overlapped by distinct projected blocks is close (for example 60% of the overlap by a first projected block and 63% of the overlap by a second projected block). According to an embodiment of the invention, a motion vector is similar to a candidate vector when the motion vector is equal to the candidate vector or else when the difference between the motion vector and the candidate vector is close to zero.

According to one embodiment of the invention, the encoding method also comprises the following steps:
  predicting the current block by shifting the block of the reference image, associated with the projected motion vector selected during the allotting step, along the selected projected motion vector delivering a predicted block;

determining at least one residue of texture by comparison of the current block and the predicted block;

encoding the residue or residues of texture.

Thus, according to this embodiment, the invention proposes to improve the encoding technique of the direct temporal mode by proposing a prediction with a current block of the current image to be predicted computed from a motion compensation performed from the projected motion of several blocks of the reference image.

Since the current block is predicted along the path of the blocks of the reference image closest to the real path of the current block, the cost of encoding the residue of texture is reduced.

According to another embodiment, the encoding method also comprises the following steps:

determining a motion vector associated with the current block;

determining at least one motion vector residue by comparison of the selected projected motion vector and the motion vector associated with the current block;

encoding the motion vector residue or residues.

According to this embodiment, the invention enables the prediction of a motion vector. Thus, the selected projected motion vector is used as a predictor of the "true" motion vector of the current block, determined according to another known technique (as described according to the H.264 standard for example).

Then, the prediction residue obtained is determined and encoded by subtracting the selected projected motion vector from the true motion vector.

In other words, the encoder can use the selected projected motion vector for a current block according to an embodiment of the invention as a prediction for the motion vector estimated for this current block in order to reduce the cost of encoding the motion of the block.

It is then possible for the current block not to be encoded according to this encoding mode but the selected projected motion vector can be used to improve the performance of another encoding mode.

In particular, the encoding method comprises a step for predicting at least one motion vector associated with a block neighboring the current block in the current image, on the basis of the projected motion vector selected during the allotting step.

Thus, the selected projected motion vector can be used for predicting the motion vectors of the neighboring blocks. An embodiment of the invention thus optimizes the cost of encoding the motion vectors of the current blocks and/or of its neighboring blocks.

According to another embodiment, it is possible to combine the two embodiments proposed here above by determining and encoding both the residue of texture and a residue of motion for at least one block of the current image.

According to yet another embodiment, it is possible to encode neither the residue or residues of texture nor the residue or residues of motion for at least one block of the current image. This mode of encoding is also called the "skip" mode.

According to another aspect of an embodiment of the invention, the encoding method comprises a step of insertion, into a stream representing the sequence of images, of at least one flag representing a novel mode of encoding implemented for at least one block (for example sized 64×64) or sub-block (for example sized 16×16) of the current image, signaling the use of at least one projected motion vector selected for the encoding of the block or sub-block.

In particular, it can be noted that if a block is encoded by using the novel encoding mode, this novel encoding mode is imposed on the sub-blocks coming from this block. For example, considering a block sized 16×16, partitioned into four sub-blocks sized 8×8, it is sought to allot a projected motion vector to each sub-block coming from this block.

Such a flag can be inserted into the stream to signal the fact that the novel encoding mode can be applied to one or more sub-blocks or blocks or images or even to the entire image sequence.

It is thus possible to specify, at the level of the block (or of a sub-block), that it is encoded in this novel mode in order to differentiate it from the classic "inter" and "intra" encoding modes. For example, a flag of this kind is called an "INTER_NEW_MODE". Thus, each block of the current image can be encoded by using a distinct encoding mode (novel encoding mode, "intra" encoding mode, "inter" encoding mode, etc.).

According to one variant, it is possible, at the image sequence (or image) level, to specify that all the blocks or sub-blocks are encoded according to a known technique ("inter", "skip", etc.) by using the selected projected motion vector according to an embodiment of the invention. This projected motion vector is therefore used as a predictor.

It is also possible to provide at least one other flag specifying the type of prediction implemented for this block or sub-block of the current image belonging to the group comprising:

a flag signaling an encoding of at least one residue of a motion vector for the block;

a flag signaling an encoding of at least one residue of a texture for the block;

a flag signaling an absence of encoding of the block.

Thus, on reading this flag, a decoder immediately knows:

whether a block is encoded by using a prediction of texture implementing a motion compensation by means of the selected projected motion vector as described here above; and/or whether a block is encoded by using, for the prediction of its motion vector, the selected projected motion vector as described here above;

whether a block is not encoded.

In another embodiment, the invention pertains to a device for encoding a sequence of images comprising means for predicting at least one current image by forward motion compensation from at least one reference image, such prediction means comprising, for at least one block of the current image, called a current block, means of forward projection of at least one block of the reference image on the current image, delivering at least one projected block at least partially overlapping the current block, a motion vector, representing the shifting of the projected block in the current image, standardized to take account of a temporal distance between the reference image and the current image, called a projected motion vector, being associated with each projected block.

According to an embodiment of the invention, the prediction means comprise, for the above-mentioned current block, means for partitioning of the current block delivering at least one sub-block at least partially overlapped by at least one of the projected blocks, called an overlapped sub-block, and comprise the following means, activated at least once for at least one overlapped sub-block in the form of an iteration:

means for checking that the overlapped sub-block complies with a predetermined allotting criterion;

means for allotting, to the overlapped sub-block, one of the projected motion vectors selected from among the projected motion vector or vectors associated with the projected block or blocks at least partially overlapping the overlapped sub-block, activated in the event of a positive check;

means for partitioning the overlapped sub-block delivering at least one new overlapped sub-block, activated in the event of a negative check, and so long as a predetermined minimum size is not reached for the overlapped sub-block.

An encoding device of this kind is especially suited to implementing the encoding method described here above. It may be for example an MPEG or H.264 type video encoder or an encoder according to a future compression standard.

This device could of course comprise the different characteristics of the encoding method according to an embodiment of the invention. Thus, the characteristics and advantages of this encoder are the same as those of the encoding method and are not described in more ample detail.

An embodiment of the invention also pertains to a stream representing a sequence of images encoded according to the method described here above. A stream of this kind comprises at least one flag representing a novel encoding mode implemented for at least one block or sub-block of the current image, signaling the use of at least one selected projected motion vector for the encoding of the block or sub-block.

This stream could of course comprise the different characteristics of the encoding method according to an embodiment of the invention.

An embodiment of the invention also pertains to a recording medium carrying a stream as described here above.

Another aspect of the invention pertains to a method for decoding a stream representing a sequence of images implementing a step for predicting at least one image to be rebuilt by forward motion compensation from at least one reference image, a step for predicting of this kind implementing, for at least one block of the image to be rebuilt, called a block to be rebuilt, a sub-step of forward projection of at least one block of the reference image on the image to be rebuilt, delivering at least one projected block at least partially overlapping the block to be rebuilt, a motion vector, representing the shift of the block projected in the image to be rebuilt, standardized to take account of a temporal distance between the reference image and the image to be rebuilt, called a projected motion vector, being associated with each projected block.

According to an embodiment of the invention, the step for predicting implements the following sub-steps for the above-mentioned block to be rebuilt:

partitioning of the block to be rebuilt, delivering at least one sub-block at least partially overlapped by at least one of the projected blocks, called an overlapped sub-block;

at least one iteration of the following steps for at least one overlapped sub-block:

checking that the overlapped sub-block complies with a predetermined allotting criterion;

in the event of a positive check: allotting, to the overlapped sub-block, one of the projected motion vectors selected from among the projected motion vector or vectors associated with the projected block or blocks at least partially overlapping the overlapped sub-block;

in the event of a negative check, and so long as a predetermined minimum size is not reached for the overlapped sub-block: partitioning of the overlapped sub-block delivering at least one new overlapped sub-block.

A decoding method of this kind is especially suited to decoding an image sequence encoded according to the encoding method described here above. In this way, the same prediction steps are performed as at encoding, so as to select the same projected motion vector as at encoding.

For example, the decoder can read at least one flag representing a novel encoding mode implemented for at least one block or sub-block of the image to be rebuilt, signaling the use of at least one selected projected motion vector for the encoding of the block or sub-block.

It can also read at least one other flag representing a type of prediction implemented during the encoding of the block to be rebuilt, the flag or indicators belonging to the group comprising:

a flag signaling an encoding of at least one motion vector residue of the block;

a flag signaling an encoding of at least one residue of texture of the block;

a flag signaling an absence of encoding of the block.

In this way, the decoder immediately knows the processing to be performed to decode the block to be rebuilt.

For example, when the block to be rebuilt has been encoded by using a prediction of texture implementing motion compensation by means of the selected projected motion vector, the decoding method implements the following steps:

predicting the block to be reconstructed, by shifting the block of the reference image associated with the projected motion vector selected during the allotting step along the selected projected motion vector, delivering a predicted block;

decoding at least one residue of texture extracted from this stream representing an image sequence, obtained during the encoding of the image sequence;

rebuilding the block to be rebuilt from the residue or residues of texture and from the predicted block.

When the block to be rebuilt has been encoded by using the selected, projected motion vector for the prediction of its motion vector, the decoding method implements the following steps:

determining a motion vector associated with the block to be rebuilt;

decoding at least one residue of a motion vector extracted from this stream representing a sequence of images obtained during the encoding of the image sequence;

rebuilding the block to be rebuilt from the residue or residues of the motion vector and from the motion vector associated with the block to be rebuilt.

It is also possible to decode both residues of motion and residues of texture if these two pieces of information have been encoded, or none of these pieces of information if neither the residue of texture nor the residue of motion have been encoded for a block.

Another aspect of the invention pertains to a device for decoding a stream representing a sequence of images, comprising means for predicting at least one image to be rebuilt by forward motion compensation from at least one reference image, prediction means of this kind comprising, for at least one block of the image to be rebuilt, called a block to be rebuilt, means of forward projection of at least one block of the reference image on the image to be rebuilt, delivering at least one projected block at least partially overlapping the block to be rebuilt, a motion vector representing the shift of the block projected in the image to be rebuilt, standardized to take account of a temporal distance between the reference image and the image to be rebuilt, called a projected motion vector, being associated with each projected block.

According to an embodiment of the invention, the prediction means comprise, for the above-mentioned block to be rebuilt, means for partitioning the block to be rebuilt delivering at least one sub-block at least partially overlapped by at least one of the projected blocks, called an overlapped sub-block;

and comprise the following means, activated at least once for at least one overlapped sub-block in the form of an iteration:

means for checking that the overlapped sub-block complies with a predetermined allotting criterion;

means for allotting, to the overlapped sub-block, one of the projected motion vectors selected from among the projected motion vector or vectors associated with the projected block or blocks at least partially overlapping the overlapped sub-block, activated in the event of a positive check;

means for partitioning the overlapped sub-block delivering at least one new overlapped sub-block, activated in the event of a negative check, and so long as a predetermined minimum size is not reached for the overlapped sub-block.

A decoding device of this kind is especially suited to implementing the decoding method described here above. It may be for example an MPEG or H.264 type video decoder or a decoder according to a future compression standard.

This device could of course comprise the different characteristics of the method of decoding according to an embodiment of the invention. Thus, the characteristics and advantages of this decoder are the same as those of the method of decoding, and shall not be described in more ample detail.

An embodiment of the invention also pertains to a computer program comprising instructions for implementing an encoding method and/or decoding method as described here above, when this program is executed by a processor. Such a program can use any programming language. It can be downloaded from a communications network and/or recorded on a computer-readable medium.

BRIEF DESCRIPTION OF THE DRAWINGS

Other features and advantages shall appear more clearly from the following description of a preferred embodiment, given by way of a simple, illustrative and non-exhaustive example, and from the appended drawings of which.

DETAILED DESCRIPTION OF ILLUSTRATIVE EMBODIMENTS

1. General Principle

The general principle of an embodiment of the invention relies on the partitioning into sub-blocks of at least one block of an image to be predicted, for which a piece of motion information is not immediately available. Such a situation occurs especially when this block of the image to be predicted is overlapped by several blocks projected during a forward projection of the blocks of a reference image towards the image to be predicted. Indeed, several motion vectors representing the shifting of the projected block in the current image are then available for the block of the image to be predicted. The choice of a non-optimized motion vector, i.e. a motion vector at a distance from the real path of the current block, can then lead to an increase in the cost of encoding of this block.

The solution proposed by an embodiment of the invention enables the allotting of an optimized motion vector to a block or sub-block of an image to be predicted, when several motion vectors are available for this current block. To optimize the choice of the motion vector, an embodiment of the invention proposes to work at the level of the sub-blocks for at least one block of the image to be predicted, in order to select the motion vector closest to the real path of the current block. To this end, several partitioning iterations are performed until a sub-block complying with a predetermined allotting criterion is reached.

The projected motion vector thus selected can be used in various ways at the level of the encoding or decoding, depending on the type of prediction implemented.

For example, this projected motion vector can be used to predict the texture of a block of the image to be predicted by means of a motion compensation performed on the basis of this vector. This projected motion vector can also (or alternately) be used as a predictor of a "true" motion vector of the current block, determined according to another prior-art technique.

Here below, the term "sub-block" is understood to mean a region of a block of the current image obtained by sub-dividing this block. A sub-block therefore has a size smaller than that of a block. For example, a block of the current image is sized 64×64, and a sub-block is sized 16×16.

The blocks of the reference image can for their part be of variable size. Thus, a block of the reference image can be sized 64×64 and another block of the reference image can be sized 16×16.

2. Working of the Encoder

Figure 3:
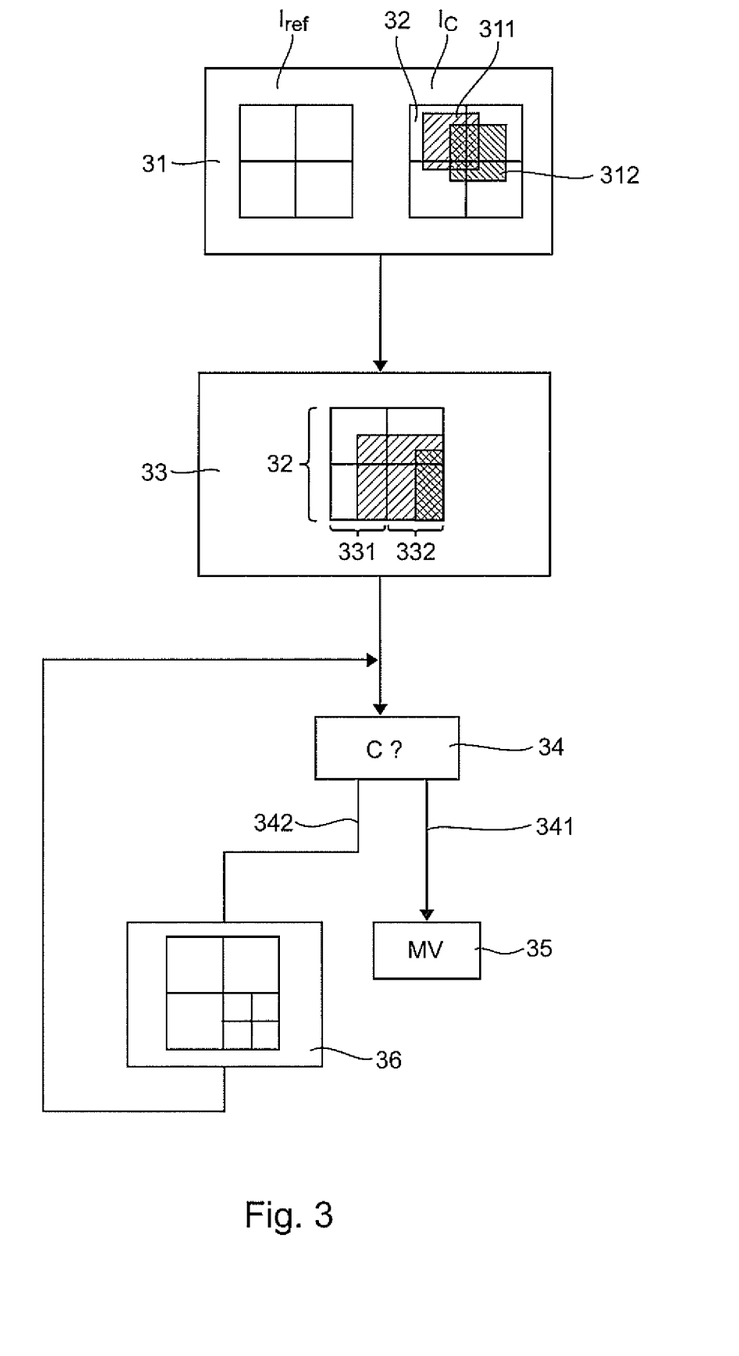
FIG. 3 presents the main steps implemented for the encoding method according to one embodiment of the invention.

Referring to FIG. 3, we present the main steps implemented for the encoding of an image sequence according to one particular embodiment of the invention.

To this end, we consider a sequence comprising at least one reference image Iref and an image to be predicted by forward motion compensation on the basis of the reference image, also called the image Ic.

According to this embodiment, the following sub-steps are performed for the prediction of at least one current block 32 of the current image Ic.

During a first step 31, at least one block of the reference image Iref is forward-projected on the current image Ic. Owing to the forward compensation, we obtain at least one projected block (311, 312) at least partially overlapping the current block 32. A motion vector, called a projected motion vector, is associated with each projected block. Such a projected motion vector represents the shifting of the projected block in the current image Ic, standardized to take account of a temporal difference between the reference image Iref and the current image Ic, as described with reference to the prior art.

In this embodiment, the blocks of the reference image do not necessarily have an identical size. Thus, it is possible to project the motion of variable-sized blocks of the reference image on the current image.

In a following step 33, the current block 32 is subdivided into sub-blocks. In this way, we obtain at least one sub-block which is at least partially overlapped by at least one of the projected blocks, called an overlapped sub-block (331, 332).

For at least one overlapped sub-block, for example the overlapped sub-block 332, at least one iteration of the following steps is performed:

checking (34) that the overlapped sub-block 332 complies with a predetermined allotting criterion;

in the event of a positive check (341): the overlapped sub-block 332 is allotted (35) one of the projected motion vectors selected from among the projected motion vectors associated with the projected blocks (311, 312) at least partially covering the overlapped sub-block 332;

in the event of a negative check (342), and so long as the predetermined minimum size has not been reached for the overlapped sub-block, the overlapped sub-block is partitioned 36, delivering at least one new overlapped sub-block.

In other words, the current block is partitioned when it is overlapped by several projected blocks and, as the case may be, the sub-blocks thus obtained are partitioned when they are overlapped by several projected sub-blocks until a predetermined allotting criterion is reached. It is sought to determine a single motion vector associated with the reference image for the current block (or for a sub-block of the current block). This determining is done by means of an iterative partitioning of the current block into variable-sized sub-blocks until a stop condition is validated.

For example, this predetermined allotting criterion belongs to the group of criteria where:

the overlapped sub-block is at least partially overlapped by only one of the projected sub-blocks;

a predetermined number of pixels of the overlapped sub-block is overlapped by one of the projected blocks.

A first example of a predetermined allotting criterion is a criterion of unicity of the projected motion vector: the overlapped sub-block is re-subdivided so long as it remains overlapped by several projected blocks. When the overlapped sub-block is overlapped by only one projected block, it can be allotted the projected motion vector associated with this projected block.

A second example of a predetermined allotting criterion is an overlapping criterion: the overlapped sub-block is re-subdivided so long as it is not overlapped up to a certain percentage by a projected block.

If these criteria of allotting are not complied with, and if the minimum possible size is achieved for the sub-block, the iterative partitioning is stopped.

If the sub-block overlapped has reached a minimum size and if it is still at least partially overlapped by several projected blocks, several solutions can be envisaged:

either the projected vector associated with the projected block covering the greatest number of points of the overlapped sub-block is selected;

or no motion vector is allotted to this overlapped sub-block.

In the latter case, it is possible to use another known encoding technique if it is desired to allot a motion vector to this sub-block.

Here below, we shall provide a more detailed description of the iterative partitioning step implemented to encode an image sequence according to a particular embodiment of the invention.

It may be recalled that it is sought, according to an embodiment of the invention, to allot a single projected motion vector to a block or sub-block of the current image.

Figure 4A:
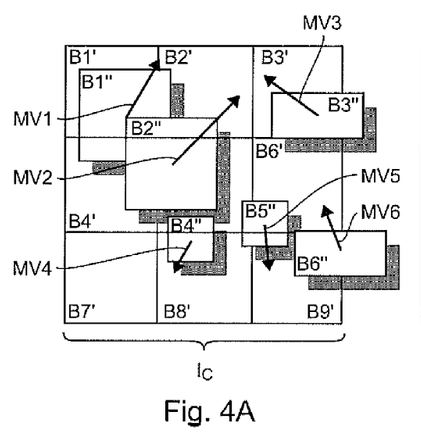
FIGS. 4A and 4B illustrate an example of implementation of the invention.
Figure 4B:
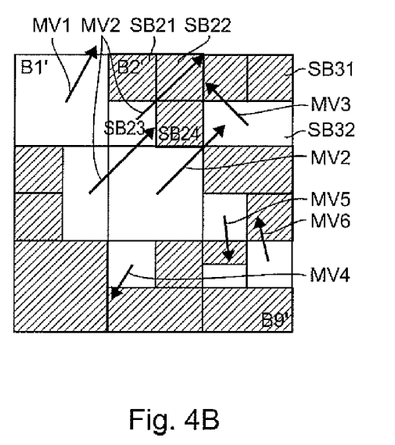

As illustrated in FIGS. 4A and 4B, we consider for example variable-sized blocks in the reference image Iref and standard-sized blocks in the current image Ic.

FIG. 4A provides a more precise illustration of the current image Ic, comprising for example nine blocks B1' to B9' sized 16×16. These blocks can be subdivided into sub-blocks sized 16×8, 8×16 or 8×8. In this example, we also consider a minimum size of the sub-blocks equal to 8×8.

The blocks B1" to B6", superimposed on the blocks B1' to B9' of the current image Ic correspond to the forward projections of the blocks B1 to B6 of the reference image (not shown). The blocks B1" to B6" are also called projected blocks. As illustrated in FIG. 4A, these projected blocks can be of different sizes.

Each of these projected blocks is associated with a projected motion vector (MV1 to MV6) representing the shift of the projected block in the current image scaled to take account of a temporal distance between the reference image, the current image and possibly another reference image from which the motion vector was computed (see FIG. 1).

We consider for example the current block B2' of the image to be predicted Ic which is partially overlapped by the projected blocks B1" and B2". In the current image Ic, it is therefore possible to allot two projected motion vectors (MV1 and MV2) to the current block B2'.

In order to select the best projected motion vector to be allotted to the current block B2', it is proposed according to an embodiment of the invention to partition the current block B2' iteratively.

For example, during the partitioning step 33, the current block B2' is subdivided into four sub-blocks SB21, SB22, SB23 and SB24 sixed 8×8, as illustrated in FIG. 4B. Other partitionings can be envisaged. For example, the sub-division can be optimized in order to determine the best partitioning of the block. This optimization can consist in jointly minimizing the number of motion vectors projected in each sub-block and maximizing the number of points of each sub-block covered by each motion vector projected in the sub-block.

According to the example illustrated in FIG. 4A, it is noted that the sub-block SB21 is partially overlapped by the projected block B1", that the sub-block SB22 is not overlapped by any projected block, that the sub-block SB23 is partially overlapped by the projected blocks B1" and B2" and that the sub-block SB24 is partially overlapped by the projected block B2".

It is then sought to allot a projected motion vector to one of the sub-blocks, for example the sub-block SB23, also called an overlapped sub-block. Indeed, it is this sub-block that has the largest number of pixels overlapped by the projected sub-block B1" and B2".

To this end, the operation starts by checking as to whether one of the overlapped sub-blocks, for example the overlapped sub-block SB23, complies with a predetermined allotting criterion such as an overlapping criterion during the step 34.

This criterion is considered to be verified if a predetermined number of pixels of the overlapped sub-block SB23 (or a percentage, for example 60%) is overlapped by one of the projected blocks. Since the projected block B2" covers the overlapped sub-block SB23 up to more than 60%, the allotting criterion is verified (341) for this overlapped sub-block SB23. The projected motion vector MV2 is therefore allotted (35) to the overlapped sub-block SB23 (the other sub-blocks SB21 and SB24 are not sufficiently overlapped for a motion vector to be allotted to one of these sub-blocks).

An embodiment of the invention then passes to the next block in the current image, denoted as B3'.

This current block B3' is partitioned into two 8×16 sub-blocks, denoted as SB31 and SB32, during the partitioning step 33. Only the sub-block SB32 is partially overlapped by a projected block, the block B3". A check (34) is therefore made to see if the overlapped sub-block SB32 complies with the overlapping criterion defined here above. If this is the case (341), the projected motion vector MV3 is allotted (35) to the overlapped sub-block SB32. If not (342), the overlapped sub-block SB32 is re-subdivided (36) into several sub-blocks, if the minimum size of the sub-blocks has not been reached and the previous steps are reiterated.

If several candidate vectors are still possible for an overlapped sub-block (for example because the minimum sub-division size has been reached), it is possible, in this embodiment, to select the projected motion vector covering the greatest number of points of the overlapped sub-block (a variant shall be described here below).

If no candidate vector is available for an overlapped sub-block, or if a sub-block is not overlapped by at least one projected block (such as the block SB2), it is possible to choose to allot no motion vector to this sub-block or else to allot to it, by default, the motion vector previously associated with a neighboring block/sub-block. For example, the sub-block SB22 can be allotted the motion vector of its neighboring sub-block SB21.

Other predetermined criteria can be used for the allotting of the projected motion vectors such as for example the criterion of unicity of the projected motion vector mentioned here above.

In short, it can be considered that the invention, in this embodiment, proposes a technique of adaptive partitioning of a standard-sized current block of the image to be predicted into a set of sub-blocks having a non-standard or variable size (the sub-blocks do not necessarily have the same size). This technique enables the allotting of a projected motion vector to a sub-block of the current block, this projected motion vector corresponding to a motion vector (scaled) of a block of the reference image, this block of the reference image possibly having a size different from that of the sub-block.

It can be noted that it is also possible to apply this overlapping criterion (or one of the other criteria mentioned here above) directly to a block without partitioning it. For example, the block B1' of the current image is not subdivided and it is assigned the projected motion vector associated with the projected block which covers it most (up to more than 60%). In this example, it is assigned the projected motion vector MV1.

Furthermore, it is possible not to allot any motion vector to a block of the current image if none of the criteria mentioned here above is complied with. For example, no projected motion vector is allotted to the block B7', At the end of these steps, a projected motion vector is defined for at least certain blocks of the current image.

Here below, we describe an alternative embodiment implemented during the step 35 for allotting a projected motion vector when several candidate vectors are available.

We return to the example of FIGS. 4A and 4B in considering a predetermined allotting criterion of overlapping, and several vector candidates for the overlapped sub-block SB23 of the block B2'. For example, the candidate vectors are the projected motion vector MV1 (the projected block B1" overlapping the overlapped sub-block SB23 to more than 60%) and the projected motion vector MV2 (the projected block B2" which itself also overlaps the overlapped sub-block SB23 to more than 60%).

In order to select the vector candidate that most closely approaches the real path of the overlapped sub-block SB23, the following steps are implemented according to this alternative embodiment:

backward projection in the reference image of the overlapped sub-block SB23 along each of the candidate vectors MV1 and MV2. We then obtain two backward projected sub-blocks $SB23^{-MV1}$ and $SB23^{-MV2}$ in the reference image Iref;

for each backward projected sub-block $SB23^{-MV1}$ and $SB23^{-MV2}$: determining the number of pixels of the reference image overlapped by the backward projected sub-block having a motion vector similar to the corresponding candidate vector. For example, the backward projected sub-block $SB23^{-MV1}$ associated with the candidate vector MV1 overlaps a zone of the reference image, associated with the motion vector MV1, to 62%. The backward projected sub-block $SB23^{-MV2}$ associated with a candidate vector MV2 overlaps a zone of the reference image, associated with a motion vector MV2, to 65%;

then the candidate vector having the best overlap rate is allotted to the overlapped sub-block SB23. In our example therefore, the projected motion vector MV2 is allotted to the overlapped sub-block SB23.

This alternative implementation performs well when several projected blocks have a fairly close overlap rate.

In order to determine the overlap rate associated with each candidate vector, several techniques are possible:

either the number of points of the reference image, in the backward projected sub-block, having exactly the same motion vector as the vector candidate is counted;

or a proximity metric is computed, in scanning for example all the points of the reference image localized in the backward projected sub-block, and allotting them a value equal to 0 or 1 depending on their distance to the candidate vector, so as to obtain a measurement of the proximity in summing these values. For example, such a metric is expressed in the following form:

sum on the points p present in the backward projected sub-block associated with the function \delta(candidate vector—motion vector associated with the point p), where \delta(x) is a decreasing monotonic function relative to the amplitude of the vector x (difference between the backward projected motion vector and the motion vector associated with the point p). An example of a function such as this is for example: \delta(x)=1 if x==0, else \delta(x)=0. Another example is: \delta(v) =−abs(v·x)−abs(v·y).

Here below, we present another alternative mode of implementation enabling the allotting of a single motion vector to a block or sub-block of the image to be predicted.

In this variant, the current block is partitioned into a set of sub-blocks each having a minimum size. For example, the current block is subdivided into sub-blocks sized 8×8.

Each sub-block can be overlapped by one or more projected blocks coming from the forward projection of the blocks of the image reference on the current image. A set of motion vectors is therefore obtained on the sub-blocks.

The sub-blocks can then be grouped together if they have a common characteristic. For example, the neighboring sub-blocks overlapped by a same projected block and therefore having a same projected motion vector are grouped together (or merged).

If a current sub-block is overlapped by several projected blocks, the neighboring sub-blocks of the current sub-block are looked at and this sub-block is grouped with the neighboring sub-blocks which are overlapped by one of the projected blocks overlapping the current sub-block.

Thus, an adaptive partitioning of the current block is rebuilt in grouping together the sub-blocks having a common characteristic. In this way, a single projected motion vector is associated with a grouping of sub-blocks, thus smoothing the motion field.

Besides, as already indicated, the projected motion vector allotted to a block can be used in various ways for the encoding of an image or a sequence of images.

According to a first example, this projected motion vector can be used for the prediction of the texture of the current block, in performing a motion compensation by means of the motion vector and the reference image. Thus, it is possible to predict the current block by shifting the block of the reference image associated with the projected motion vector selected during the allotting step along the selected projected motion vector, to determine at least one residue of texture in comparing the current block and the predicted block and then encoding the residue or residues of texture thus obtained.

A two-way prediction can also be implemented in performing a second motion compensation in determining a second motion vector (possibly by using the technique proposed according to an embodiment of the invention) from the motion vector of the reference image and in scaling it relatively to the current image and the reference image with reference to which the motion vector has been computed.

The prediction thus obtained therefore enables the computation of a residue of texture for the current block which is then converted, quantified and transmitted to an entropy encoder.

In a second example, this projected motion vector can be used for the prediction of the estimated motion vector of the current block. In other words, the selected, projected motion vector can be used as a predictor of the "true" motion vector of the current block, determined according to another known technique (as described according to the H.264 standard for example). To this end, a motion vector associated with the current block is determined by using a known technique. Then a motion vector residue is determined in comparing the selected projected motion vector and the motion vector determined by using another technique. The residue of motion thus obtained is then encoded for the current block.

The mode of encoding of the current block thus proposed can be put into competition with other modes of encoding for this current block.

3. Signaling

If the novel encoding mode proposed according to an embodiment of the invention is used, it is necessary to signal, in the stream representing the image sequence, the use of this novel encoding mode if the use of this novel encoding mode is not systematic.

For example, a flag "INTER_NEW_MODE", representing a novel encoding mode implemented for at least one block or sub-block of a current image, is inserted into the stream representing the sequence of images encoded according to the encoding method described here above.

A flag of this kind can be inserted into the stream to signal the fact that the novel encoding mode can be applied to one or more sub-blocks or blocks of images or even to the entire image sequence.

It is thus possible, at the level of the block (or a sub-block), to specify that it is encoded in this novel mode to differentiate it from the classic "inter" and "intra" encoding modes. This signaling at the block level dictates the use of this encoding mode for all the partitions into sub-blocks of this block. In other words, it is sought to allot a projected motion vector determined according to an embodiment of the invention to sub-blocks coming from a partition of this block. If no motion vector is allotted to a sub-block at the end of the partitioning (for example because a minimum size has been reached for this sub-block or because this sub-block does not meet any allotting criterion), then another prior-art technique can be used for encoding this sub-block. For example, this sub-block is allotted a motion vector corresponding to a median vector obtained from neighboring sub-blocks of this sub-block.

According to one variant, this new flag indicates the fact, at the image sequence level (or at an image level), that all the blocks or sub-blocks are encoded according to a known technique ("inter", "skip", etc.) in using the projected motion vector selected according to an embodiment of the invention.

Furthermore, it is possible to insert a flag representing a type of prediction implemented for this block or sub-block. For example, a flag of this kind can signal:
the encoding of at least one motion vector residue for the block (or it can signal the new motion predictor used for the block), and/or
the encoding of at least one residue of texture for the block, or
an absence of encoding of the block.

By contrast, the steps of forward projection, partitioning and the iterative steps do not call for any particular signaling in the stream. It is enough for the decoder to apply the same predetermined allotting criterion as the encoder.

4. Working of the Decoder

Figure 5:
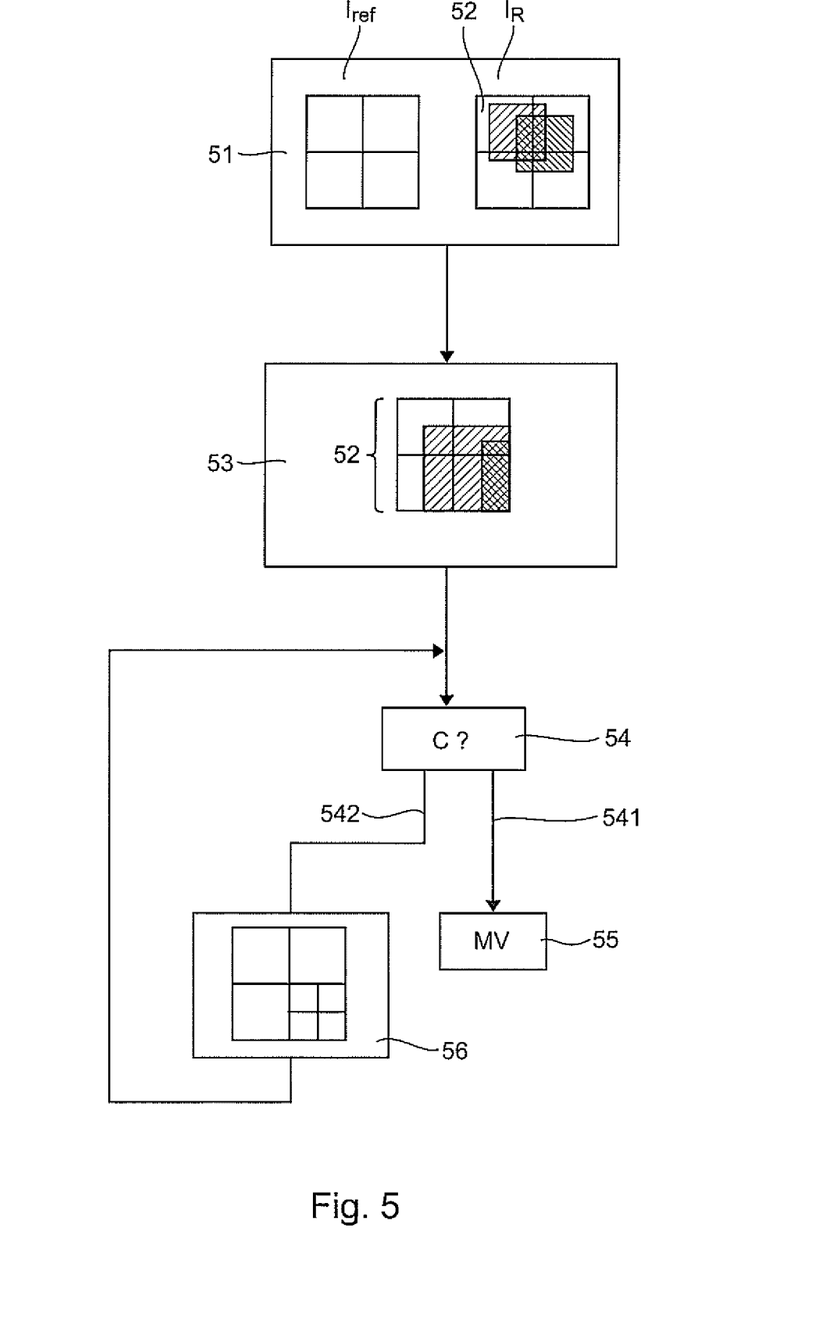
FIG. 5 shows the main steps implemented by the decoding method according to one embodiment of the invention.

Referring now to FIG. 5, we present the main steps implemented for the decoding of a stream representing an image sequence according to a particular embodiment of the invention.

To this end, we consider a reference image Iref (previously rebuilt) and an image to be rebuilt Ir.

According to this embodiment, the following sub-steps are performed to predict at least one block of the image to be rebuilt, called a block to be rebuilt 52:
forward projection (51) of at least one block of the reference image on the image to be rebuilt, delivering at least one projected block at least partially overlapping the block to be rebuilt,
a motion vector representing the shifting of the block projected in the image to be rebuilt, standardized to take account of a temporal distance between the reference image and the image to be rebuilt, called a projected motion vector, being associated with each projected block;
partitioning (53) of the block to be rebuilt, delivering at least one sub-block overlapped at least partially by at least one of the projected blocks, called an overlapped sub-block;
at least one iteration of the following steps for at least one overlapped sub-block:
checking (54) that the overlapped sub-block complies with a predetermined allotting criterion;
in the event of a positive check (541): allotting the overlapped sub-block one of the projected motion vectors selected from among the projected motion vectors associated with the projected block or blocks at least partially overlapping the overlapped sub-block;

in the event of a negative check (542), and so long as the predetermined minimum size has not been reached for the overlapped sub-block, partitioning (56) the overlapped sub-block, delivering at least one new overlapped sub-block.

These steps are similar to those performed when encoding, so as to select the same projected motion vector as at encoding. They are therefore not described in greater detail.

If the novel encoding mode is implemented during the encoding of this block to be rebuilt (or a sub-block), the decoder knows that it must decode this block or sub-block specifically, through the presence of the "INTER_NEW_MODE" flag in the stream.

In particular, the type of prediction implemented during the encoding of the block to be rebuilt can also be signaled in the stream and the decoder knows the treatment that it must perform to decode the block to be rebuilt.

For example, when the block to be rebuilt has been encoded in using a prediction of texture implementing a motion compensation by means of a selected projected motion vector, the decoding method implements a prediction of the block to be rebuilt in shifting the block of the reference image, associated with the projected motion vector selected during the allotting step, along the selected projected motion vector, a decoding of the residue or residues of texture extracted from the stream and a rebuilding of the block to be rebuilt, from the residue or residues of texture and the predicted block.

When the block to be rebuilt has been encoded by using, for the prediction of its motion vector, the selected projected motion vector, the decoding method implements a determining of a motion vector associated with the block to be rebuilt in using a prior-art technique, a decoding of the motion vector residue or residues extracted from the stream and a rebuilding of the block to be rebuilt from the motion vector residue or residues and from the motion vector associated with the block to be rebuilt.

It is also possible that the block to be rebuilt has not been encoded or has been encoded in both texture and motion.

It is also possible that no motion vector has been allotted to a block or sub-block during the encoding. In this case, it is possible, during the rebuilding of the image, to allot a motion vector to this block or sub-block in using the neighboring blocks or sub-blocks. For example, this block or sub-block will be allotted a motion vector corresponding to a median vector as done classically with the AVC standard.

5. Structure of the Encoder and the Decoder

Figure 6:
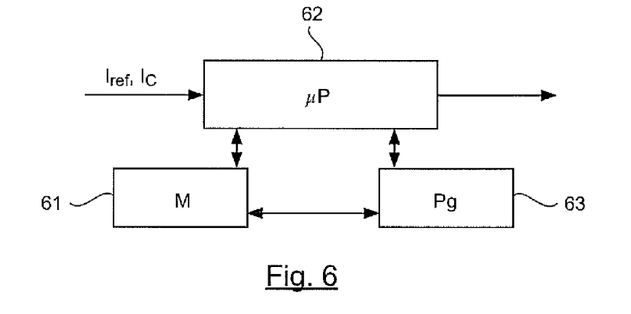
FIGS. 6 and 7 respectively present the structure of an encoder and a decoder according to one particular embodiment of the invention.
Figure 7:
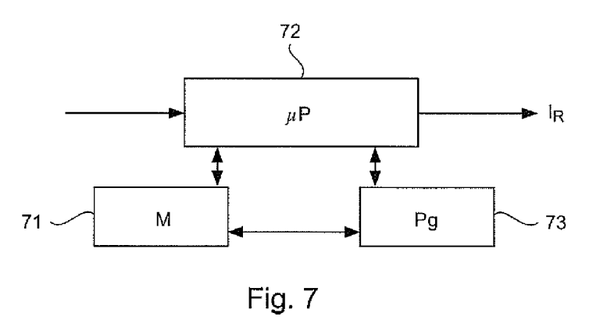

Finally, referring to FIGS. 6 and 7, we present the simplified structures of an encoder and a decoder respectively implementing an encoding technique and a decoding technique according to one of the embodiments described here above.

For example, the encoder device comprises a memory 61 comprising a buffer memory, a processing unit 62 equipped for example with a microprocessor µP and driven by the computer program 63, implementing the encoding method according to an embodiment of the invention.

At initialization, the code instructions of the computer program 63 are for example loaded into a RAM and then executed by the processor of the processing unit 62. The processing unit 62 inputs at least a reference image and a current image. The microprocessor of the processing unit 62 implements the steps of the encoding method described here above according to the instructions of the computer program 63 to allot a projected motion vector to at least one of the blocks of the current image. To this end, the encoder device comprises, in addition to the buffer memory 61, means of forward projection of at least one block of the reference image on the current image (delivering one or more projected blocks), means for partitioning the current block (delivering at least one overlapped sub-block), means for checking that the overlapped sub-block complies with a predetermined allotting criterion; means for allotting, to the overlapped sub-block, one of the projected motion vectors and means for partitioning the overlapped sub-block. These means are driven by the microprocessor of the processing unit 62.

The decoder for its part comprises a memory 71 comprising a buffer memory, a processing unit 72 equipped for example with a microprocessor µP and driven by the computer program 73 implementing the decoding method according to an embodiment of the invention.

At initialization, the code instructions of the computer program 73 are for example loaded into a RAM and then executed by the processor of the processing unit 72. The processing unit 72 inputs a stream representing a sequence of images. The microprocessor of the processing unit 72 implements the steps of the decoding method described here above according to the instructions of the computer program 73 to allot a projected motion vector to at least one of the blocks of the image to be rebuilt. To this end, the decoding device comprises, in addition to the buffer memory 71, means of forward projection of at least one block of the reference image on the image to be rebuilt (delivering one or more projected blocks), means for partitioning the current block (delivering at least one overlapped sub-block), means for checking that the overlapped sub-block complies with a predetermined allotting criterion; means for allotting, to the overlapped sub-block, one of the projected motion vectors and means for partitioning the overlapped sub-block. These means are driven by the microprocessor of the processing unit 72.

Although the present disclosure has been described with reference to one or more examples, workers skilled in the art will recognize that changes may be made in form and detail without departing from the scope of the disclosure and/or the appended claims.

The invention claimed is:

1. A method for encoding a sequence of images, the method comprising:

receiving by a processor of an encoding device at least one current image and at least one reference image, the current image being divided into a plurality of blocks;

generating with the processor a prediction of the at least one current image by forward motion compensation from the at least one reference image, wherein forward motion compensation uses motion vectors pointing from the reference image towards the at least one current image, and wherein generating the prediction comprises:

for at least one block of said current image, called an overlapped current block, a sub-step of forward projection of at least two blocks of the reference image on said current image, delivering at least two projected blocks at least partially overlapping said overlapped current block, and two motion vectors, each motion vector representing shift of one of the projected blocks in the current image;

partitioning said overlapped current block into a plurality of sub-blocks, wherein at least one of the sub-blocks is at least partially overlapped by at least one of said projected blocks, called an overlapped sub-block; and at least one iteration of the following steps for at least one overlapped sub-block:

checking that the overlapped sub-block complies with a predetermined allotting criterion that is based on overlap of the at least one projected block with respect to the overlapped sub-block;

if the overlapped sub-block complies with the predetermined allotting criterion, allotting, to said overlapped sub-block, one of the projected motion vectors selected from among the projected motion vector or vectors associated with the projected block or blocks at least partially overlapping said overlapped sub-block; and if the overlapped sub-block does not comply with the predetermined allotting criterion, and so long as a predetermined minimum size is not reached for said overlapped sub-block: partitioning of said overlapped sub-block into a plurality of new sub-blocks, wherein at least one new sub-block, called a new overlapped sub-block, is at least partially overlapped by at least one of said projected blocks.

2. The method for encoding according to claim 1, wherein said predetermined allotting criterion pertains to the group consisting of the following criteria:

the overlapped sub-block is overlapped at least partially by only one of the projected blocks;

a predetermined number of pixels of the overlapped sub-block is overlapped by one of the projected blocks.

3. The method for encoding according to claim 1, wherein said allotting step selects the projected motion vector associated with the projected block overlapping the most pixels of said overlapped sub-block.

4. The method for encoding according to claim 1, wherein said allotting step implements the following for at least two projected blocks at least partially overlapping said overlapped sub-block with which projected motion vectors called candidate vectors are associated:

a step of backward projection, in said reference image, of said overlapped sub-block along each of said candidate vectors, delivering at least two backward projected sub-blocks;

for each sub-block projected backward along a candidate vector, determining the number of pixels of said reference image overlapped by said backward projected sub-block having a motion vector similar to said candidate vector, delivering an overlap rate per candidate vector;

allotting, to the overlapped sub-block, the candidate vector having the best overlap rate.

5. The method for encoding according to claim 1, wherein the method also comprises the following steps:

predicting said current block by shifting the block of the reference image, associated with the projected motion vector selected during said allotting step, along said selected projected motion vector, delivering a predicted block;

determining at least one residue of texture by comparison of said current block and the predicted block;

encoding said at least one residue of texture.

6. The method for encoding according to claim 1, wherein the method also comprises the following steps:

determining a motion vector associated with said current block;

determining at least one motion vector residue by comparison of said selected projected motion vector and said motion vector associated with said current block;

encoding said at least one motion vector residue.

7. The method for encoding according to claim 1, wherein the method comprises predicting at least one motion vector associated with a block neighboring said current block in said current image, from said projected motion vector selected during said allotting step.

8. The method for encoding according to claim 1, wherein the method comprises a step of insertion, into a stream representing said sequence of images, of at least one flag representing a novel mode of encoding implemented for at least one block or sub-block of the current image, signaling the use of at least one projected motion vector selected for the encoding of said block or sub-block.

9. An encoding device for encoding a sequence of images, the encoding device comprising:

an input receiving at least one current image and at least one reference image, the current image being divided into a plurality of blocks;

an output;

a non-transitory computer-readable medium comprising instructions stored thereon;

a processor, which is configured by the instructions to perform acts of:

generating with the processor a prediction of the at least one current image by forward motion compensation from the at least one reference image, wherein forward motion compensation uses motion vectors pointing from the reference image towards the at least one current image, and generating the prediction comprises, for at least one block of said current image, called an overlapped current block:

forward projection of at least two blocks of the reference image on said current image, delivering at least two projected blocks at least partially overlapping said overlapped current block, and two motion vectors, each motion vector representing shifting of one of the projected blocks in the current image, partitioning said overlapped current block into a plurality of sub-blocks, wherein at least one of the sub-blocks is at least partially overlapped by at least one of said projected blocks, called an overlapped sub-block, and at least iteration of the following steps for at least one overlapped sub-block:

checking that the overlapped sub-block complies with a predetermined allotting criterion that is based on overlap of the at least one projected block with respect to the overlapped sub-block;

allotting, to said overlapped sub-block, one of said projected motion vectors selected from among the projected motion vector or vectors associated with the projected block or blocks at least partially overlapping the overlapped sub-block, activated if the overlapped sub-block complies with the predetermined allotting criterion; and partitioning said overlapped sub-block into a plurality of new sub-blocks, wherein at least one new sub-block, called a new overlapped sub-block, is at least partially overlapped by at least one of said projected blocks, the means for partitioning said overlapped sub-block being activated if the overlapped sub-block does not comply with the predetermined allotting criterion, and so long as a predetermined minimum size is not reached for said overlapped sub-block.

10. The method of claim 1, further comprising:
generating a stream representing the sequence of images encoded, wherein the stream comprises at least one flag representing a novel encoding mode implemented for at least one block or sub-block of the current image, signaling use of at least one selected projected motion vector for the encoding of said block or sub-block.

11. A method for decoding a stream representing a sequence of images, the method comprising:
receiving by a processor of a decoding device the stream representing the sequence of images;
generating a prediction with the processor of at least one image of the stream to be rebuilt by forward motion compensation from at least one reference image, the image to be rebuilt being divided into a plurality of blocks, wherein forward motion compensation uses motion vectors pointing from the reference image towards the at least one current image, and wherein generating a prediction comprises:
for at least one block of said image to be rebuilt, called an overlapped current block to be rebuilt, a sub-step of forward projection of at least two blocks of the reference image on said image to be rebuilt, delivering at least two projected blocks at least partially overlapping said overlapped current block to be rebuilt, and two motion vectors, each motion vector representing shift of one of the blocks projected in the image to be rebuilt,
partitioning said overlapped current block into a plurality of sub-blocks, wherein at least one of the sub-blocks is at least partially overlapped by at least one of said projected blocks, called an overlapped sub-block; and
at least one iteration of the following steps for at least one overlapped sub-block:
checking that the overlapped sub-block complies with a predetermined allotting criterion that is based on overlap of the at least one projected block with respect to the overlapped sub-block;
if the overlapped sub-block complies with the predetermined allotting criterion: allotting, to said overlapped sub-block, one of said projected motion vectors selected from among the projected motion vector or vectors associated with said projected block or blocks at least partially overlapping said overlapped sub-block; and
if the overlapped sub-block does not comply with the predetermined allotting criterion, and so long as a predetermined minimum size is not reached for said overlapped sub-block: partitioning said overlapped sub-block into a plurality of new sub-blocks, wherein at least one new sub-block, called a new overlapped sub-block, is at least partially overlapped by at least one of said projected blocks.

12. The method for decoding according to claim 11, wherein the method also implements the following steps:
predicting said block to be reconstructed, by shifting the block of the reference image associated with the projected motion vector selected during said allotting step along said selected projected motion vector, delivering a predicted block;
decoding at least one residue of texture extracted from said stream representing a sequence of images, obtained during the encoding of said sequence of image; and
rebuilding said block to be rebuilt from said at least one residue of texture and from the predicted block.

13. The method for decoding according to claim 11, wherein the method also implements the following steps:
determining a motion vector associated with said block to be rebuilt;
decoding at least one residue of a motion vector extracted from said stream representing a sequence of images, obtained during the encoding of said sequence of images; and
rebuilding said block to be rebuilt from said at least one residue of the motion vector and from said motion vector associated with said block to be rebuilt.

14. A decoding device for decoding a stream representing a sequence of images, the decoding device comprising:
an input receiving the stream representing the sequence of images;
an output;
a non-transitory computer-readable medium comprising instructions stored thereon;
a processor, which is configured by the instructions to perform acts of:
generating a prediction of at least one image of the stream to be rebuilt by forward motion compensation from at least one reference image, the image to be rebuilt being divided into a plurality of blocks, wherein forward motion compensation uses motion vectors pointing from the reference image towards the at least one current image, and wherein generating comprises, for at least one block of said image to be rebuilt, called an overlapped current block to be rebuilt:
forward projection of at least two blocks of the reference image on said image to be rebuilt, delivering at least two projected blocks at least partially overlapping said overlapped current block to be rebuilt, and two motion vectors, each motion vector representing shift of one of the blocks projected in the image to be rebuilt,
partitioning said overlapped current block into a plurality of sub-blocks, wherein at least one of the sub-blocks is at least partially overlapped by at least one of said projected blocks, called an overlapped sub-block, and
at least iteration of the following steps for at least one overlapped sub-block:
checking that said overlapped sub-block complies with a predetermined allotting criterion that is based on overlap of the at least one projected block with respect to the overlapped sub-block;
allotting, to said overlapped sub-block, one of said projected motion vectors selected from among the projected motion vector or vectors associated with the projected block or blocks at least partially overlapping said overlapped sub-block, activated if the overlapped sub-block complies with the predetermined allotting criterion; and
partitioning said overlapped sub-block into a plurality of new sub-blocks, wherein at least one new sub-block, called a new overlapped sub-block, is at least partially overlapped by at least one of said projected blocks, the means for partitioning said overlapped sub-block being activated if the overlapped sub-block does not comply with the predetermined allotting criterion, and so long as a predetermined minimum size is not reached for said overlapped sub-block.

15. A non-transitory computer-readable medium comprising a computer program comprising instructions for implementing a method for encoding a sequence of images, when this program is executed by a processor of an encoding device, wherein the instructions comprise:

instructions configured to cause the processor to receive at least one current image and at least one reference image and to generate a prediction of the at least one current image by forward motion compensation from the at least one reference image, the current image being divided into a plurality of blocks, wherein forward motion compensation uses motion vectors pointing from the reference image towards the at least one current image, and wherein the processor implements:

for at least one block of said current image, called an overlapped current block, a sub-step of forward projection of at least two blocks of the reference image on said current image, delivering at least two projected blocks at least partially overlapping said overlapped current block, and two motion vectors, each motion vector representing shift of one of the projected blocks in the current image;

partitioning said overlapped current block into a plurality of sub-blocks, wherein at least one of the sub-blocks is at least partially overlapped by at least one of said projected blocks, called an overlapped sub-block; and at least one iteration of the following steps for at least one overlapped sub-block:

checking that the overlapped sub-block complies with a predetermined allotting criterion that is based on overlap of the at least one projected block with respect to the overlapped sub-block;

if the overlapped sub-block complies with the predetermined allotting criterion, allotting, to said overlapped sub-block, one of the projected motion vectors selected from among the projected motion vector or vectors associated with the projected block or blocks at least partially overlapping said overlapped sub-block; and if the overlapped sub-block does not comply with the predetermined allotting criterion, and so long as a predetermined minimum size is not reached for said overlapped sub-block: partitioning said overlapped sub-block into a plurality of new sub-blocks, wherein at least one new sub-block, called a new overlapped sub-block, is at least partially overlapped by at least one of said projected blocks.

16. The method of claim 1, further comprising:

determining a residue of texture of the overlapped sub-block or a residue of motion associated with the overlapped sub-block, using the projected motion vector allotted to the overlapped sub-block;

encoding said residue of texture or said residue of motion, to produce an encoded residue; and outputting a stream from the encoding device representing said sequence of images and comprising the encoded residue.

17. The method of claim 11, further comprising:

decoding with the processor a residue of texture or a residue of motion associated with said overlapped sub-block, extracted from said stream, to produce a decoded residue;

rebuilding with the processor said overlapped sub-block using the projected motion vector allotted to said overlapped sub-block and the decoded residue; and outputting the rebuilt overlapped sub-block of the image to be rebuilt.

* * * * *